United States Patent
Goto et al.

(10) Patent No.: US 11,537,730 B2
(45) Date of Patent: Dec. 27, 2022

(54) PROCESSING APPARATUS, SEMICONDUCTOR INTEGRATED CIRCUIT, AND STATUS MONITORING METHOD

(71) Applicant: SOCIONEXT INC., Kanagawa (JP)

(72) Inventors: Seiji Goto, Yokohama (JP); Eiichi Nimoda, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 264 days.

(21) Appl. No.: 16/899,256

(22) Filed: Jun. 11, 2020

(65) Prior Publication Data
US 2020/0302069 A1   Sep. 24, 2020

Related U.S. Application Data

(63) Continuation of application No. PCT/JP2018/041022, filed on Nov. 5, 2018.

(30) Foreign Application Priority Data

Dec. 27, 2017  (JP) .............................. JP2017-251764

(51) Int. Cl.
*G06F 21/60* (2013.01)
*G06F 9/4401* (2018.01)
*G06F 11/07* (2006.01)

(52) U.S. Cl.
CPC .......... *G06F 21/606* (2013.01); *G06F 9/4403* (2013.01); *G06F 11/0751* (2013.01); *G06F 11/0772* (2013.01); *G06F 21/602* (2013.01)

(58) Field of Classification Search
CPC .. G06F 21/606; G06F 9/4403; G06F 11/0751; G06F 11/0772; G06F 21/602;
(Continued)

(56) References Cited

U.S. PATENT DOCUMENTS

| 2006/0015748 A1 | 1/2006 | Goto et al. |
| 2007/0076593 A1* | 4/2007 | Sakurai ............. B60W 50/0205 370/219 |

(Continued)

FOREIGN PATENT DOCUMENTS

| JP | 2006-018528 A | 1/2006 |
| JP | 2007-174628 A | 7/2007 |

(Continued)

OTHER PUBLICATIONS

International Search Report issued in corresponding International Patent Application No. PCT/JP2018/041022, dated Jan. 29, 2019, with English translation.

*Primary Examiner* — Thien Nguyen
(74) *Attorney, Agent, or Firm* — McDermott Will & Emery LLP

(57) ABSTRACT

In a processing apparatus having semiconductor integrated circuits, a first status monitoring circuit included in a first semiconductor integrated circuit is configured to instruct a plurality of second semiconductor integrated circuits to transmit status information indicating statuses of the plurality of second semiconductor integrated circuits. When a second status monitoring circuit included in each of the plurality of second semiconductor integrated circuits receives the instruction for transmission of the corresponding status information, the second status monitoring circuit transmits encrypted information in which the status information is encrypted to the first semiconductor integrated circuit.

20 Claims, 10 Drawing Sheets

(58) Field of Classification Search
CPC ............. G06F 11/3058; G06F 11/3006; G06F 11/3055; G06F 11/3068; G06F 21/575; G06F 11/30; G06F 11/34; G06F 11/36; H04L 9/32

See application file for complete search history.

(56) References Cited

U.S. PATENT DOCUMENTS

| | | |
|---|---|---|
| 2007/0143606 A1 | 6/2007 | Bandholz et al. |
| 2007/0198851 A1 | 8/2007 | Goto |
| 2013/0067253 A1* | 3/2013 | Tsuda .................... G06Q 50/06 713/300 |
| 2014/0344431 A1 | 11/2014 | Hsu et al. |
| 2018/0132196 A1* | 5/2018 | Yang .................... H04B 17/318 |
| 2019/0104112 A1* | 4/2019 | Frazer ................... H04L 9/3273 |
| 2019/0162760 A1* | 5/2019 | Yamahira ................ H02H 3/08 |
| 2019/0171821 A1 | 6/2019 | Asano et al. |
| 2020/0122265 A1* | 4/2020 | Kawai .................. B23K 9/1075 |

FOREIGN PATENT DOCUMENTS

| | | |
|---|---|---|
| JP | 2007-226481 A | 9/2007 |
| JP | 2010-198397 A | 9/2010 |
| JP | 2015-095171 A | 5/2015 |
| JP | 2017-163329 A | 9/2017 |
| WO | 2018/042766 A1 | 3/2018 |

\* cited by examiner

PROCESSING APPARATUS, SEMICONDUCTOR INTEGRATED CIRCUIT, AND STATUS MONITORING METHOD

CROSS-REFERENCE TO RELATED APPLICATION

This application is a continuation application of International Application PCT/JP2018/041022 filed on Nov. 5, 2018 and designated the U.S., which is based upon and claims the benefit of priority of the prior Japanese Patent Application No. 2017-251764, filed on Dec. 27, 2017, the entire contents of which are incorporated herein by reference.

FIELD

The embodiments discussed herein are related to a processing apparatus, a semiconductor integrated circuit, and a status monitoring method.

BACKGROUND

There is a conventional technique for monitoring statuses (temperatures, voltages, etc.) of a plurality of servers. In this technique, a baseboard management controller (BMC) arranged per server detects a status by using a sensor and transmits the detected status to a client computer via a network.

In addition, there has been proposed a system including a plurality of system-on-chips (SoCs) along with the recent increase in the system complexity and scale.

See, for example, U.S. Patent Application Publication No. 2014/0344431.

The conventional technique as described above may be applied to a system including a plurality of semiconductor integrated circuits such as SoCs, to monitor statuses of the individual semiconductor integrated circuits. To do so, a status monitoring chip corresponding a BMC is arranged for each of the semiconductor integrated circuits. In addition, an external system is arranged for collecting the statuses monitored by the individual status monitoring chips. In this case, since information about the statuses of the semiconductor integrated circuits are exposed to the outside, there is a problem in that the security is not ensured.

SUMMARY

According to one aspect, there is provided a processing apparatus including: a first semiconductor integrated circuit; and a plurality of second semiconductor integrated circuits, wherein the first semiconductor integrated circuit includes a first status monitoring circuit configured to instruct the plurality of second semiconductor integrated circuits to transmit status information indicating respective statuses of the plurality of second semiconductor integrated circuits, and wherein each of the plurality of second semiconductor integrated circuits includes a second status monitoring circuit configured to transmit, upon receiving an instruction for transmission of the status information, encrypted information in which the status information is encrypted to the first semiconductor integrated circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments will be described with reference to the accompanying drawings.

First Embodiment

Figure 1:
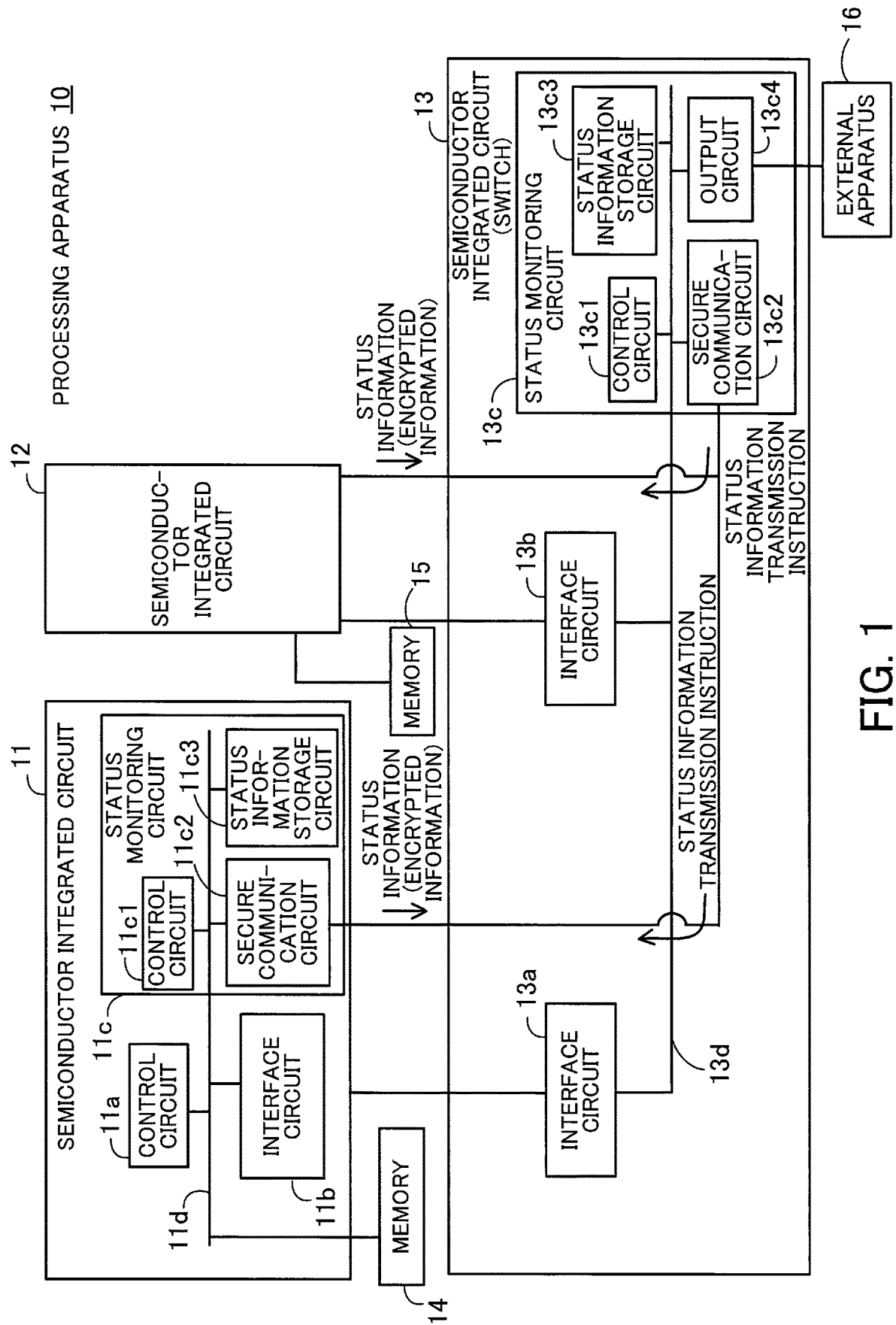
FIG. 1 illustrates an example of a processing apparatus and semiconductor integrated circuits according to a first embodiment.

FIG. 1 illustrates an example of a processing apparatus and semiconductor integrated circuits according to a first embodiment.

This processing apparatus 10 includes semiconductor integrated circuits 11, 12, and 13.

For example, each of these semiconductor integrated circuits 11 to 13 is a one-chip SoC. While the processing apparatus 10 in FIG. 1 includes three semiconductor integrated circuits 11 to 13, the number of semiconductor integrated circuits is not particularly limited to three, as long as the processing apparatus 10 includes at least two semiconductor integrated circuits. The processing apparatus 10 may be realized by configuring at least two semiconductor integrated circuits as a one-chip SoC.

The semiconductor integrated circuit 11 includes a control circuit 11a, an interface circuit 11b, and a status monitoring circuit 11c, all of which are connected to a system bus 11d.

The control circuit 11a performs various kinds of application processing by loading at least a part of the programs or data stored in a read-only memory (ROM) not illustrated to a memory 14, executing the program, and controlling various parts in the semiconductor integrated circuit 11. The control circuit 11a is, for example, a microcontroller, a central processing unit (CPU), or a CPU having a plurality of CPU cores. The memory 14 is a volatile memory such as a dynamic random access memory (DRAM), for example.

The interface circuit 11b is a communication interface that communicates with the semiconductor integrated circuit 13. The interface circuit 11b is, for example, a peripheral component interconnect express (PCIe) interface, a universal serial bus (USB) interface, or the like.

The status monitoring circuit 11c holds status information indicating a status of the semiconductor integrated circuit 11. When receiving an instruction for transmission of the status information from the semiconductor integrated circuit 13, the status monitoring circuit 11c transmits encrypted information in which the status information is encrypted to the semiconductor integrated circuit 13. The status monitoring circuit 11c functions as a slave when the processing apparatus 10 performs status monitoring processing.

The status monitoring circuit 11c includes a control circuit 11c1, a secure communication circuit 11c2, and a status information storage circuit 11c3, all of which are connected to the system bus 11d.

The control circuit 11c1 is, for example, a microcontroller, a CPU, or a CPU having a plurality of CPU cores and controls various parts in the status monitoring circuit 11c based on a program stored in a ROM not illustrated.

When receiving an instruction for transmission of the status information from the semiconductor integrated circuit 13, the secure communication circuit 11c2 encrypts the status information stored in the status information storage circuit 11c3 and transmits the encrypted status information to the semiconductor integrated circuit 13. When the signal instructing the transmission of the status information is encrypted, the secure communication circuit 11c2 decrypts this encrypted signal.

The secure communication circuit 11c2 is connected to a dedicated network different from a network to which the interface circuit 11b is connected. For example, a dedicated network using the Ethernet (registered trademark) protocol is used. While the network to which the interface circuit 1ib is connected may be connected to an element outside the processing apparatus 10, the dedicated network is not connected to any element outside the processing apparatus 10.

The status information storage circuit 11c3 holds the status information about the status of the semiconductor integrated circuit 11. Examples of the status of the semiconductor integrated circuit 11 include the temperature detected by a sensor not illustrated, the load status of the control circuit 11a, and the status of power supply voltage supplied to the semiconductor integrated circuit 11.

The semiconductor integrated circuit 12 also have the functions equivalent to those of the semiconductor integrated circuit 11. Namely, the semiconductor integrated circuit 12 holds status information indicating a status of the semiconductor integrated circuit 12. When receiving an instruction for transmission of the status information from the semiconductor integrated circuit 13, the semiconductor integrated circuit 12 transmits encrypted information in which the status information is encrypted to the semiconductor integrated circuit 13. As is the case with the semiconductor integrated circuit 11, the semiconductor integrated circuit 12 is connected to a memory 15 such as a DRAM.

The semiconductor integrated circuit 13 is a network switch (which will simply be referred to as a switch) that transfer data exchanged with the semiconductor integrated circuits 11 and 12. The semiconductor integrated circuit 13 includes interface circuits 13a and 13b and a status monitoring circuit 13c.

The interface circuit 13a is a communication interface that communicates with the semiconductor integrated circuit 11. The interface circuit 13b is a communication interface that communicates with the semiconductor integrated circuit 12. For example, the interface circuits 13a and 13b are PCIe interfaces, USB interfaces, etc.

The status monitoring circuit 13c instructs the semiconductor integrated circuits 11 and 12 to transmit the status information indicating the statuses of the semiconductor integrated circuits 11 and 12. In addition, when receiving the encrypted information in which the status information is encrypted from the semiconductor integrated circuits 11 and 12, the status monitoring circuit 13c decrypts the encrypted information to generates the status information and outputs the status information to an external apparatus 16. The status monitoring circuit 13c functions as a master when the processing apparatus 10 performs the status monitoring processing.

The status monitoring circuit 13c includes a control circuit 13c1, a secure communication circuit 13c2, a status information storage circuit 13c3, and an output circuit 13c4.

The control circuit 13c1 is, for example, a microcontroller, a CPU, or a CPU having a plurality of CPU cores and controls various parts in the status monitoring circuit 13c based on a program stored in a ROM not illustrated.

The secure communication circuit 13c2 encrypts signals that instruct the semiconductor integrated circuits 11 and 12 to transmit the status information and transmits the encrypted signal. In addition, when receiving the encrypted information in which the status information is encrypted from the semiconductor integrated circuits 11 and 12, the secure communication circuit 13c2 decrypts the encrypted information to generate the status information. The secure communication circuit 13c2 may transmit an unencrypted signal instructing transmission of the status information.

The status information storage circuit 13c3 holds status information about a status of the semiconductor integrated circuit 13. In addition, the status information storage circuit 13c3 may hold the status information indicating the statuses of the semiconductor integrated circuits 11 and 12, the status information having been received by the secure communication circuit 13c2.

Controlled by the control circuit 13c1, the output circuit 13c4 outputs the status information about the statuses of the semiconductor integrated circuits 11 to 13 to the external apparatus 16. The external apparatus 16 is a personal computer, a tablet terminal, or the like.

Hereinafter, an operation example of the processing apparatus 10 will be described.

After the semiconductor integrated circuits 11 to 13 are booted, the status monitoring circuits 11c and 13c (and the status monitoring circuit (not illustrated) in the semiconductor integrated circuit 12) acquire and hold status information, for example, at regular intervals. When the processing apparatus 10 performs the status monitoring processing, for example, the semiconductor integrated circuit 13 functions as a master, and the semiconductor integrated circuits 11 and 12 function as slaves.

When the processing apparatus 10, namely, the semiconductor integrated circuits 11 to 13, performs boot processing, a boot code may be received and transmitted securely by using the secure communication circuits 11c2 and 13c2, etc. When the processing apparatus 10 performs the boot processing, for example, while the semiconductor integrated circuit 11 functions as a master and the semiconductor integrated circuit 12 functions as a slave, the semiconductor integrated circuit 13 functions as a network switch. An example of this processing will be described below.

In contrast, in the status monitoring circuit 13c that functions as a master when the processing apparatus 10 performs the status monitoring processing, the control circuit 13c1 causes the secure communication circuit 13c2 to transmit signals that instruct transmission of the status information to the semiconductor integrated circuits 11 and 12 at regular intervals, for example.

When the secure communication circuit 11c2 in the status monitoring circuit 11c that functions as a slave when the processing apparatus 10 performs the status monitoring processing receives the signal that instructs transmission of the status information, the secure communication circuit 11c2 gives this signal to the control circuit 11c1 (if the signal is encrypted, the secure communication circuit 11c2 decrypts the signal and transmits the decrypted signal). The control circuit 11c1 reads the status information stored in the status information storage circuit 11c3 and transmits the read status information to the secure communication circuit 11c2. When the secure communication circuit 11c2 receives a signal that instructs transmission of certain status information among a plurality of items of status information, the control circuit 11c1 reads the certain status information by specifying the corresponding address of the status information storage circuit 11c3 in which the certain status information is stored. The secure communication circuit 11c2 encrypts the read status information and transmits the encrypted status information to the semiconductor integrated circuit 13.

The status monitoring circuit (not illustrated) in the semiconductor integrated circuit 12 also performs the equivalent processing.

When the secure communication circuit 13c2 in the status monitoring circuit 13c receives encrypted status information from the semiconductor integrated circuit 11 or 12, the secure communication circuit 13c2 decrypts the encrypted status information. The output circuit 13c4 outputs the decrypted status information to the external apparatus 16 along with the status information about the status of the semiconductor integrated circuit 13 stored in the status information storage circuit 13c3. The external apparatus 16 is, for example, a personal computer and displays the status information on a display. The decrypted status information may temporarily be stored in the status information storage circuit 13c3 or another storage apparatus, for example.

The control circuit 13c1 in the status monitoring circuit 13c may cause the secure communication circuit 13c2 to transmit a signal for controlling a certain semiconductor integrated circuit based on the received status information. For example, when status information indicating the temperature around the control circuit 11a in the semiconductor integrated circuit 11 indicates abnormal temperature, the control circuit 13c1 in the status monitoring circuit 13c may transmit a signal that instructs turning off of the power supplied to the control circuit 11a to the semiconductor integrated circuit 11. A user who has checked the status information displayed on the display of the external apparatus 16 may enter an instruction for transmission of a signal for controlling a certain semiconductor integrated circuit by using an input device not illustrated to the semiconductor integrated circuit 13.

In the case of the processing apparatus 10 as described above, the status information indicating the statuses of the semiconductor integrated circuits 11 and 12 is encrypted, and the encrypted status information is collected by the semiconductor integrated circuit 13. In this way, the statuses of the semiconductor integrated circuits 11 and 12 are securely monitored. In addition, complexity of the wiring is made less than that of a case where another chip for collecting the status information indicating the statuses of the semiconductor integrated circuit 11 to 13 is arranged.

In the above description, while the status monitoring circuit 13c in the semiconductor integrated circuit 13, which is a switch, functions as a master in the status monitoring processing, the present embodiment is not limited to this example. The status monitoring circuit 11c in the semiconductor integrated circuit 11 may function as a master in the status monitoring processing.

However, by using the status monitoring circuit 13c in the semiconductor integrated circuit 13, which is a switch, as a master in the status monitoring processing, complexity of the wiring in the processing apparatus 10 is avoided.

Second Embodiment

Figure 2:
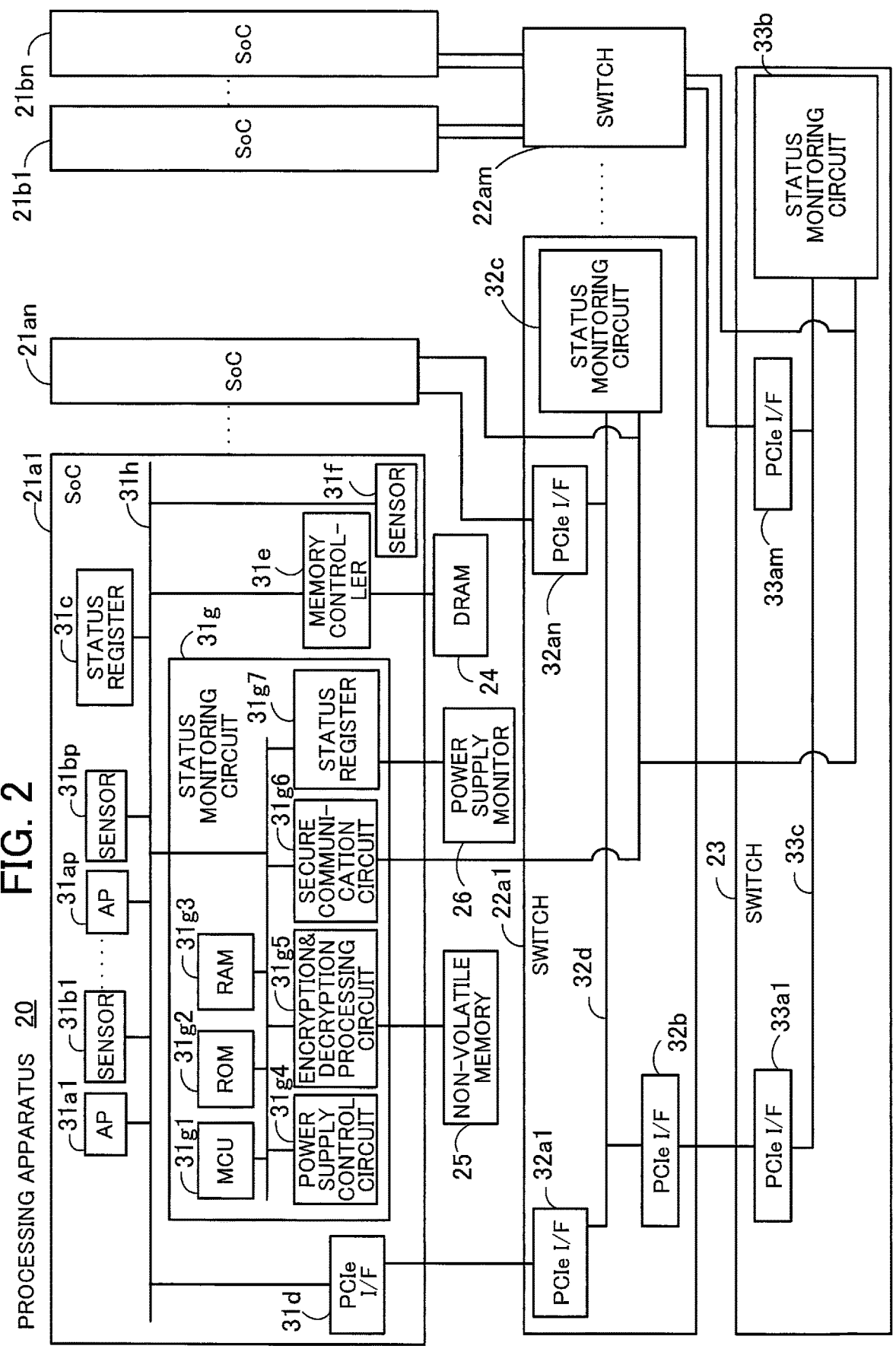
FIG. 2 illustrates an example of a processing apparatus and semiconductor integrated circuits according to a second embodiment.

FIG. 2 illustrates an example of a processing apparatus and semiconductor integrated circuits according to a second embodiment.

This processing apparatus 20 includes SoCs 21a1 to 21an, SoCs 21b1 to 21bn, switches 22a1 to 22am, and a switch 23, each of which is an example of a semiconductor integrated circuit.

In the example of the processing apparatus 20 in FIG. 2, each of these m switches 22a1 to 22am is connected to n SoCs. For example, the SoCs 21a1 to 21an are connected to the switch 22a1, and the SoCs 21b1 to 21bn are connected to the switch 22am. In addition, the switches 22a1 to 22am are connected to the single switch 23. Namely, the processing apparatus 20 in FIG. 2 is a system having three hierarchical layers. Alternatively, the processing apparatus 20 may include more switches to achieve four or more hierarchical layers.

As FIG. 2 illustrates a circuit example of the SoC 21a1, the other SoCs may be similarly configured.

The SoC 21a1 includes p application processors (APs) 31a1 to 31ap, p sensors 31b1 to 31bp, a status register 31c, a PCIe interface (I/F) 31d, a memory controller 31e, a sensor 31f, and a status monitoring circuit 31g, all of which are connected to a system bus 31h.

The APs 31a1 to 31ap are processors that perform processing of various applications. While the example in FIG. 2 illustrates an example in which a plurality (a number p) of APs 31a1 to 31ap are arranged, the SoC 21a1 may include only a single AP.

The sensors 31b1 to 31bp are temperature sensors that detect the temperatures around the APs 31a1 to 31ap, respectively. Each of the sensors 31b1 to 31bp is arranged around a corresponding one of the APs 31a to 31ap. In FIG. 2, for example, illustration of circuits that convert information (analog signals) about the temperatures detected by the sensors 31b1 to 31bp into digital signals is omitted.

The status register 31c holds status information about a status of the SoC 21a1.

The PCIe interface 31d transmits information to the switch 22a1 and receives information transmitted by the switch 22a1.

For example, controlled by the APs 31a1 to 31ap, the memory controller 31e reads and writes data on a DRAM 24. The DRAM 24 is, for example, a double-data-rate (DDR)-synchronous DRAM (SDRAM).

The sensor 31f is a temperature sensor that detects the temperature around the memory controller 31e. The sensor 31f is arranged around the memory controller 31e. In FIG. 2, for example, illustration of a circuit that converts information (an analog signal) about the temperature detected by the sensor 31f into a digital signal is omitted.

When the SoC 21a1 is connected to a plurality of DRAMs and includes a plurality of memory controllers, a plurality of sensors may be arranged for the respective memory controllers.

The status monitoring circuit 31g includes a micro controller unit (MCU) 31g1, a ROM 31g2, a random access memory (RAM) 31g3, a power supply control circuit 31g4, an encryption and decryption processing circuit 31g5, a secure communication circuit 31g6, and a status register 31g7.

The MCU 31g1 performs boot processing and status monitoring processing, which will be described below, based on a program stored in the ROM 31g2. A processor such as a CPU may alternatively be used in place of the MCU 31g1.

The ROM 31g2 is a non-volatile storage such as a flash memory and holds a program executed by the MCU 31g1 and various kinds of data. The RAM 31g3 temporarily holds at least a part of a program executed by the MCU 31g1. The RAM 31g3 holds various kinds of data used in processing performed by the MCU 31g1.

The power supply control circuit 31g4 determines whether to boot the individual parts in the SoC 21a1 by controlling turning on and off of the power supply to the individual parts via the system bus 31h.

When the SoC 21a1 functions as a master in the boot processing of the processing apparatus 20, the encryption and decryption processing circuit 31g5 encrypts a boot code for the MCUs and the APs in the other SoCs and the switches in the processing apparatus 20 and path information indicating the delivery paths of the boot code. In addition, the encryption and decryption processing circuit 31g5 stores the encrypted boot code and path information in a non-volatile memory 25 in advance. In addition, the encryption and decryption processing circuit 31g5 decrypts an encrypted boot code and path information read from the non-volatile memory 25.

The encryption and decryption processing circuit 31g5 may omit to encrypt the path information. When the SoC 21a1 functions as a slave in the boot processing of the processing apparatus 20, the SoC 21a1 may be configured without the encryption and decryption processing circuit 31g5.

The secure communication circuit 31g6 exchanges information with the secure communication circuits (not illustrated) included in the SoCs other than the SoC 21a1 and the switches 22a1 to 22am and the switch 23 by using a dedicated network using the Ethernet protocol, for example.

When the SoC 21a1 functions as a master in the boot processing of the processing apparatus 20, the secure communication circuit 31g6 encrypts the boot code and path information again and transmits the encrypted boot code and path information to the switch 22a1, for example. In addition, when the secure communication circuit 31g6 receives a signal indicating notification of completion of the reception of the boot code from the individual boot code delivery destinations via the switch 22a1, the secure communication circuit 31g6 notifies the MCU 31g1 that the individual delivery destinations have received the boot code. Next, the secure communication circuit 31g6 receives from the MCU 31g1 a signal that instructs booting of the MCUs and the APs in the SoCs and the switches of the boot code delivery destinations and then transmits the signal. The secure communication circuit 31g6 may omit to encrypt the path information.

When the SoC 21a1 functions as a slave in the boot processing of the processing apparatus 20, the secure communication circuit 31g6 receives a boot code and path information. The secure communication circuit 31g6 decrypts the boot code and path information (if encrypted). In addition, the secure communication circuit 31g6 encrypts the decrypted boot code and path information again and transmits the encrypted boot code and path information to a delivery destination specified by the path information other than the SoC 21a1 itself. In addition, the secure communication circuit 31g6 transmits a signal indicating notification of completion of the reception of the boot code and path information to the SoC or switch that functions as a master in the boot processing. In addition, upon receipt of a boot instruction signal transmitted by a master, the secure communication circuit 31g6 notifies the power supply control circuit 31g4 of the reception of the boot instruction signal. The secure communication circuit 31g6 may omit to encrypt the path information.

When the status monitoring circuit 31g functions as a slave in the status monitoring processing, the secure communication circuit 31g6 receives a signal that instructs transmission of status information from the SoC or switch including the status monitoring circuit that functions as a master in the status monitoring processing. When this signal is encrypted, the secure communication circuit 31g6 decrypts the signal. Controlled by the MCU 31g1, the secure communication circuit 31g6 encrypts the status information stored in the status register 31c or the status register 31g7 and transmits the encrypted status information to the SoC or switch including the status monitoring circuit that functions as a master.

In contrast, when the status monitoring circuit 31g functions as a master in the status monitoring processing, the secure communication circuit 31g6 encrypts a signal that instructs transmission of status information and transmits the encrypted signal. When the secure communication circuit 31g6 receives status information (encrypted information) indicating a status of another SoC or a switch in the processing apparatus 20 via the switch 22a1, the secure communication circuit 31g6 decrypts the encrypted information. The secure communication circuit 31g6 may omit to encrypt the signal that instructs transmission of the status information.

The status register 31g7 is connected to a power supply monitor 26 and holds, as status information, voltage information, which is information about the power supply voltage supplied to the SoC 21a1. While the SoC 21a1 includes the two status registers 31c and 31g7 in the example in FIG. 2, the SoC 21a1 may include only one of them.

Figure 3:
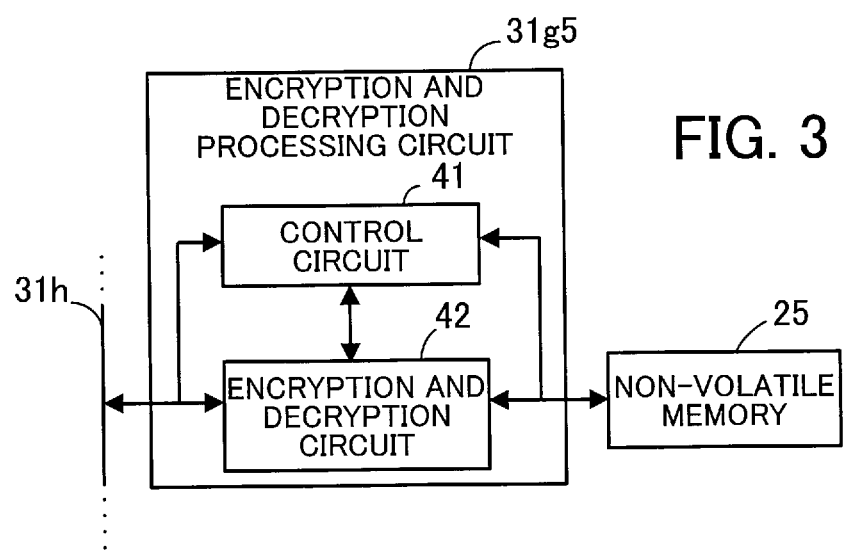
FIG. 3 illustrates an example of an encryption and decryption processing circuit.

FIG. 3 illustrates an example of the encryption and decryption processing circuit.

The encryption and decryption processing circuit 31g5 includes a control circuit 41 and an encryption and decryption circuit 42.

The control circuit 41 controls encryption and decryption processing by using the encryption and decryption circuit 42.

The encryption and decryption circuit 42 performs the encryption and decryption processing on data exchanged with the non-volatile memory 25. Hereinafter, an example of encryption and decryption processing using a hardware key and a common encryption key will be described. The following description will be made assuming that the SoC 21a1 functions as a master in the boot processing of the processing apparatus 20.

When the SoC 21a1 is initially booted, the encryption and decryption circuit 42 encrypts a boot code and path information indicating a boot code delivery path supplied from the ROM 31g2 or the RAM 31g3 via the system bus 31h with a common encryption key. In addition, the encryption and decryption circuit 42 encrypts the common encryption key with a hardware key.

The control circuit 41 stores the boot code and the path information encrypted with the common encryption key and the common encryption key encrypted with the hardware key in the non-volatile memory 25 based on the addresses (write addresses) specified by the MCU 31g1.

When booted after the initial boot, the control circuit 41 reads the encrypted common encryption key, boot code, and path information from the non-volatile memory 25 based on the addresses (read addresses) specified by the MCU 31g1. Next, controlled by the control circuit 41, the encryption and decryption circuit 42 decrypts the common encryption key with the hardware key and decrypts the boot code and the path information with the decrypted common encryption key.

A boot code, path information, and common encryption key previously encrypted by another apparatus different from the processing apparatus 20 may be stored in the non-volatile memory 25 and used as described above. In this connection, the path information may be plain.

Figure 4:
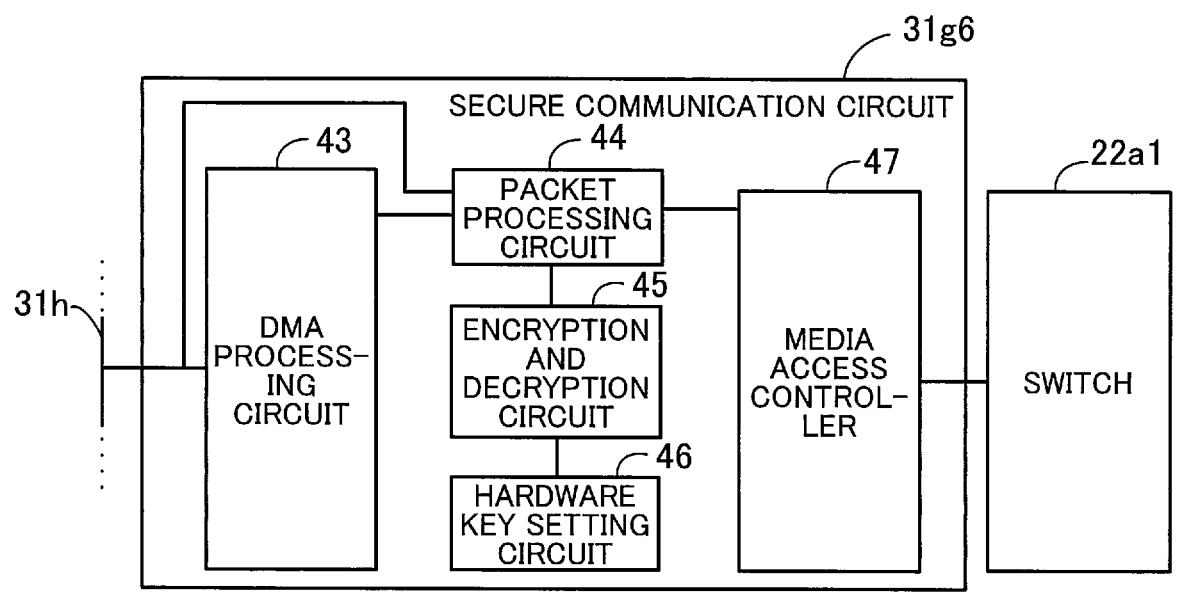
FIG. 4 illustrates an example of a secure communication circuit.

FIG. 4 illustrates an example of the secure communication circuit.

The secure communication circuit 31g6 includes a direct memory access (DMA) processing circuit 43, a packet processing circuit 44, an encryption and decryption circuit 45, a hardware key setting circuit 46, and a media access controller 47.

The DMA processing circuit 43 exchanges information with the RAM 31g3 via the system bus 31h based on a command supplied by the MCU 31g1 or the packet processing circuit 44. In addition, the DMA processing circuit 43 exchanges information with the non-volatile memory 25 via the system bus 31h and the encryption and decryption processing circuit 31g5.

The packet processing circuit 44 receives information such as the boot code and the path information received by the DMA processing circuit 43, generates a packet based on the information, and transmits the packet to the encryption and decryption circuit 45. In addition, the packet processing circuit 44 generates a packet based on the status information the MCU 31g1 has read from the status register 31c or 31g7 and transmits the packet to the encryption and decryption circuit 45.

In addition, when the packet processing circuit 44 receives an encrypted packet from the encryption and decryption circuit 45, the packet processing circuit 44 supplies the encrypted packet to the media access controller 47. In addition, when the packet processing circuit 44 receives an encrypted packet from the media access controller 47, the packet processing circuit 44 transmits the encrypted packet to the encryption and decryption circuit 45. When the packet processing circuit 44 receives a decrypted packet from the encryption and decryption circuit 45, the packet processing circuit 44 supplies the decrypted packet to the DMA processing circuit 43.

The encryption and decryption circuit 45 performs encryption and decryption of packets by using a hardware key and calculation of a hash value.

The hardware key is set in the hardware key setting circuit 46. For example, a one-time programmable ROM (OTP-ROM) such as an electrical fuse (E-fuse) may be used as the hardware key setting circuit 46.

The media access controller 47 exchanges encrypted packets by using MAC addresses.

Figure 5:
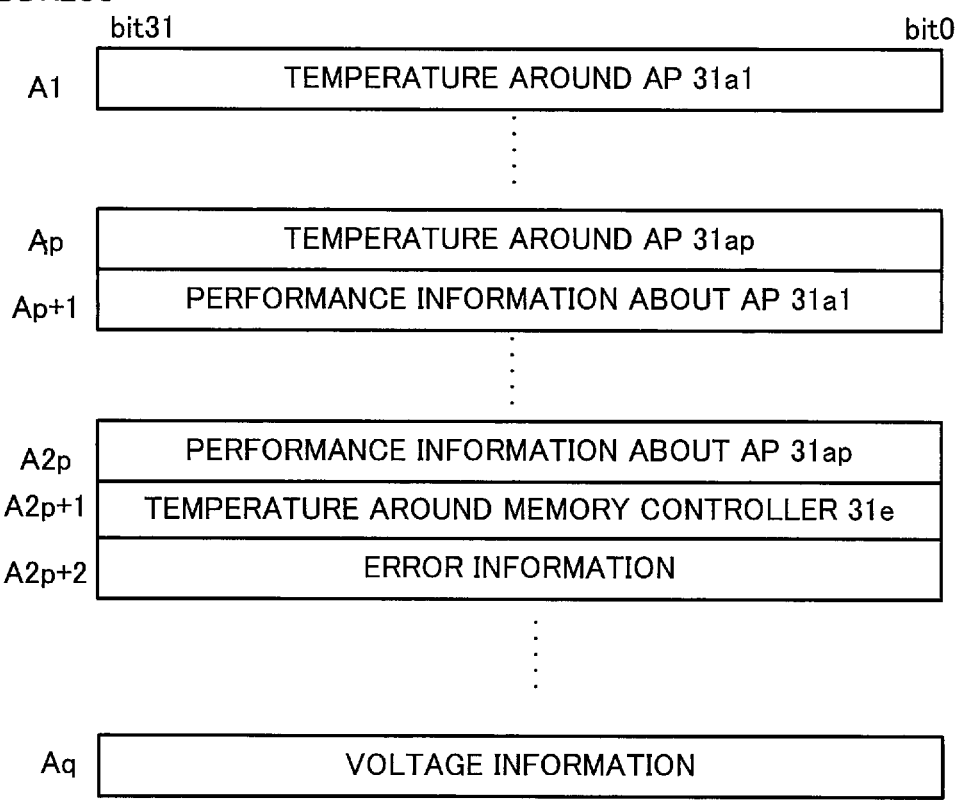
FIG. 5 illustrates an example of status information stored in status registers.

FIG. 5 illustrates an example of the status information stored in the status registers.

FIG. 5 illustrates the status information stored in the status registers 31c and 31g7. Examples of the status information include the temperatures around the APs 31a1 to 31ap detected by the sensors 31b1 to 31bp and performance information (information indicating the load statuses, etc.) about the individual APs 31a1 to 31ap acquired by performance monitoring functions of the APs 31a1 to 31ap. Examples of the status information also include the temperature around the memory controller 31e detected by the sensor 31f, error information about errors that have occurred at any of the elements in the SoC 21a1, and voltage information detected by the power supply monitor 26.

In the example in FIG. 5, an individual item of status information is represented by 32 bits. In addition, the individual items of status information are associated with addresses A1 to Aq of the status registers 31c and 31g7. For example, the temperature around the Ap 31a1 is stored in the address A1, the temperature around the memory controller 31e is stored in the address A2p+1, and the voltage information is stored in the address Aq. When the MCU 31g1 specifies one of the addresses A1 to Aq, the status information stored in the specified address is read.

The SoC 21a1 may include an output circuit to output to an external apparatus status information received when the status monitoring circuit 31g functions as a master in the status monitoring processing. The external apparatus is, for example, a personal computer connected to a display apparatus.

In FIG. 2, the switch 22a1 includes PCIe interfaces 32a1 to 32an, a PCIe interface 32b, and a status monitoring circuit 32c, all of which are connected to a system bus 32d.

The PCIe interfaces 32a1 to 32an exchange information with the SoCs 21a1 to 21an.

The PCIe interface 32b exchanges information with the switch 23.

The status monitoring circuit 32c is realized by a circuit configuration equivalent to that of the status monitoring circuit 31g in the SoC 21a1.

The other switches other than the switch 22a1 may be realized by a circuit configuration equivalent to that of the switch 22a1.

The switch 23 includes PCIe interfaces 33a1 to 33am and a status monitoring circuit 33b, all of which are connected to a system bus 33c.

The PCIe interfaces 33a1 to 33am exchange information with the switches 22a1 to 22am.

The status monitoring circuit 33b may be realized by a circuit configuration equivalent to that of the status monitoring circuit 31g in the SoC 21a1.

Hereinafter, an operation example of the processing apparatus 20 according to the second embodiment will be described.

First, an example of the boot processing of the processing apparatus 20 will be described. The following description assumes that the SoC 21a1 functions as a master in the boot processing. Hereinafter, the other SoCs, the switches 22a1 to 22am, and the switch 23 will be referred to as slaves, as needed.

When a power supply is given to the processing apparatus 20, the power supply control circuits (the power supply control circuit 31g4, etc.) in the SoCs (the SoCs 21a1 to 21*an*, etc.) and the switches 22*a*1 to 22*am* and 23 are booted. The power supply control circuits (not illustrated in FIG. 2) in the slaves perform initial settings (register settings, etc.) of their respective secure communication circuits (not illustrated in FIG. 2), and boot the secure communication circuits.

The power supply control circuit 31*g*4 in the SoC 21*a*1 functioning as a master boots the MCU 31*g*1, and the MCU 31*g*1 performs initial settings of the encryption and decryption processing circuit 31*g*5 and the secure communication circuit 31*g*6 and boots these circuits. The power supply control circuit 31*g*4 may perform the initial settings of the encryption and decryption processing circuit 31*g*5 and the secure communication circuit 31*g*6.

The encryption and decryption processing circuit 31*g*5 reads path information (decrypts the path information if the path information is encrypted) from an address in the non-volatile memory 25 specified by the initial settings by the MCU 31*g*1, for example.

The secure communication circuit 31*g*6 reads the path information from the encryption and decryption processing circuit 31*g*5 and transmits a packet to the switch 22*a*1 based on the path information, to query about the location of the switch 22*a*1.

When receiving the query about the location, the secure communication circuit in the status monitoring circuit 32*c* in the switch 22*a*1 replies to the query by transmitting a reply packet to the SoC 21*a*1. Next, the encryption and decryption processing circuit 31*g*5 in the SoC 21*a*1 reads an encrypted boot code from an address in the non-volatile memory 25 specified by the initial settings performed by the MCU 31*g*1, and decrypts the encrypted boot code, for example.

The secure communication circuit 31*g*6 reads the decrypted boot code from the encryption and decryption processing circuit 31*g*5, encrypts the boot code and the path information (the path information may be plain), and transmits the boot code and the path information to the switch 22*a*1.

The secure communication circuit in the status monitoring circuit 32*c* in the switch 22*a*1 receives the encrypted boot code and path information and performs decryption processing. Next, the secure communication circuit in the status monitoring circuit 32*c* stores the path information in a storage part (for example, a register) in the secure communication circuit and stores the boot code in a RAM in the status monitoring circuit 32*c*. In addition, the secure communication circuit in the status monitoring circuit 32*c* notifies the SoC 21*a*1 of completion of the reception of the boot code and path information by transmitting a reception completion notification signal to the SoC 21*a*1.

If the boot code delivery path indicated by the path information includes another slave as a boot code delivery destination from the switch 22*a*1, which is one of the slaves, the secure communication circuit in the status monitoring circuit 32*c* queries this slave about the location thereof. Upon receipt of a reply to the query, the secure communication circuit in the status monitoring circuit 32*c* reads a boot code from a RAM, encrypts the path information and the boot code (the path information may be plain), and transmits the path information and the boot code to this delivery destination slave.

If another slave finds still another slave as a boot code delivery destination, this slave performs the same processing as that performed by the switch 22*a*1.

When the MCU 31*g*1 in the SoC 21*a*1 is individually notified by all the slaves via the secure communication circuit 31*g*6 that the slaves have received the boot code, the MCU 31*g*1 causes the secure communication circuit 31*g*6 to transmit a boot instruction signal that instructs booting of the MCUs of all the slaves.

When receiving the boot instruction signal, the secure communication circuits of the individual slaves notify the respective power supply control circuits of the reception of the boot instruction signal. When receiving a signal indicating the reception of the boot instruction signal from the individual secure communication circuits, the respective power supply control circuits boot the respective MCUs. Next, each of the MCUs in the individual slaves performs boot processing based on the corresponding boot code stored in the RAM.

After the boot processing as described above, the status monitoring processing as will be described below is performed regularly, for example.

Figure 6:
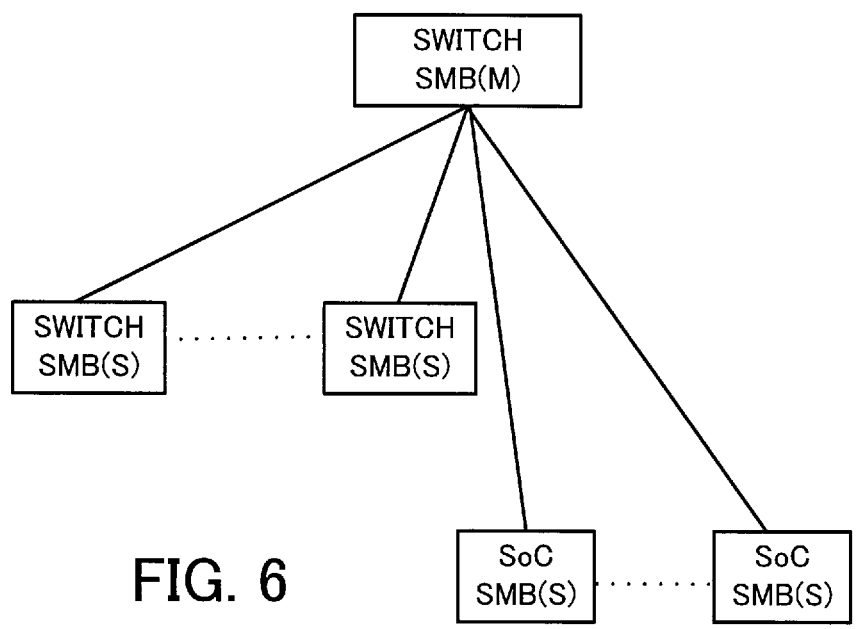
FIG. 6 illustrates an example of a relationship between a master and slaves in status monitoring processing.

FIG. 6 illustrates an example of a relationship between a master and slaves in the status monitoring processing.

In the following status monitoring processing, the status monitoring circuit ("SMB" in FIG. 6) in a single switch functions as a master ("(M)" in FIG. 6). The status monitoring circuits in the other switches and SoCs function as slaves ("(S)" in FIG. 6). In the system as illustrated in FIG. 6, the single master manages all the slaves.

The following description assumes that the status monitoring circuit 33*b* in the switch 23 illustrated in FIG. 2 functions as a master in the status monitoring processing. In addition, in the following description, the status monitoring circuits in the SoCs (the SoCs 21*a*1 to 21*an*, 21*b*1 to 21*bn*, etc.) and the switches 22*a*1 to 22*am* will be referred to as slaves, as needed.

Figure 7:
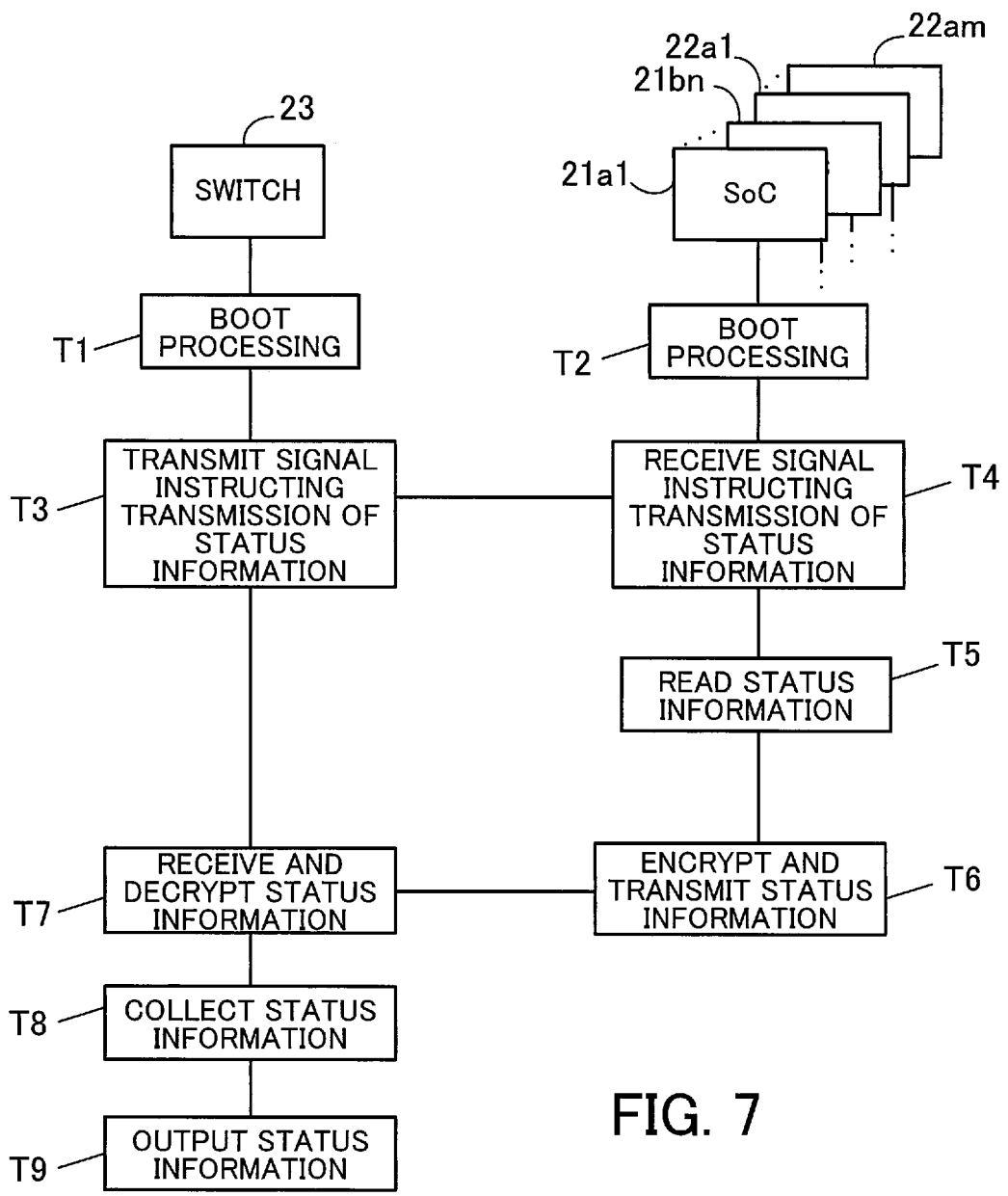
FIG. 7 is a sequence diagram illustrating an example of an operation of the processing apparatus in the status monitoring processing.

FIG. 7 is a sequence diagram illustrating an example of an operation of the processing apparatus in the status monitoring processing. FIG. 7 illustrates an operation example of the switch 23 as the master and the SoC 21*a*1 as a slave. The other slaves operate in the same way as the SoC 21*a*1.

When the above boot processing is performed by the switch 23 and SoC 21*a*1 (T1 and T2), the secure communication circuit in the status monitoring circuit 33*b* in the switch 23 encrypts a signal that instructs transmission of status information and transmits the signal to the individual slaves (T3). The secure communication circuit may omit to encrypt the signal that instructs transmission of status information.

When the secure communication circuit 31*g*6 of the SoC 21*a*1 as one slave receives the signal that instructs transmission of status information (T4), if the signal is encrypted, the secure communication circuit 31*g*6 decrypts the signal. Next, the MCU 31*g*1 reads the status information stored in the status register 31*c* or 31*g*7 (T5). When transmission of certain status information is instructed, the MCU 31*g*1 specifies the address of the status register 31*c* or 31*g*7 in which the corresponding status information is stored and reads the status information.

The secure communication circuit 31*g*6 in the SoC 21*a*1 encrypts the read status information and transmits the encrypted status information to the switch 23 (T6). The secure communication circuit in the status monitoring circuit 33*b* in the switch 23 receives and decrypts the status information (T7). Next, the MCU in the status monitoring circuit 33*b* in the switch 23 collects the status information received from the individual salves and stores the status information in the RAM in the status monitoring circuit 33*b*, for example (T8). Next, for example, the output circuit in the status monitoring circuit 33*b* outputs the collected status information to an external apparatus.

The switch 23 regularly performs the processing of T3 to T9, for example.

While the above description has been made based on an example in which a single master manages all the slaves, the status monitoring circuit in a switch in an intermediate hierarchical layer in the system may have a relay function.

Figure 8:
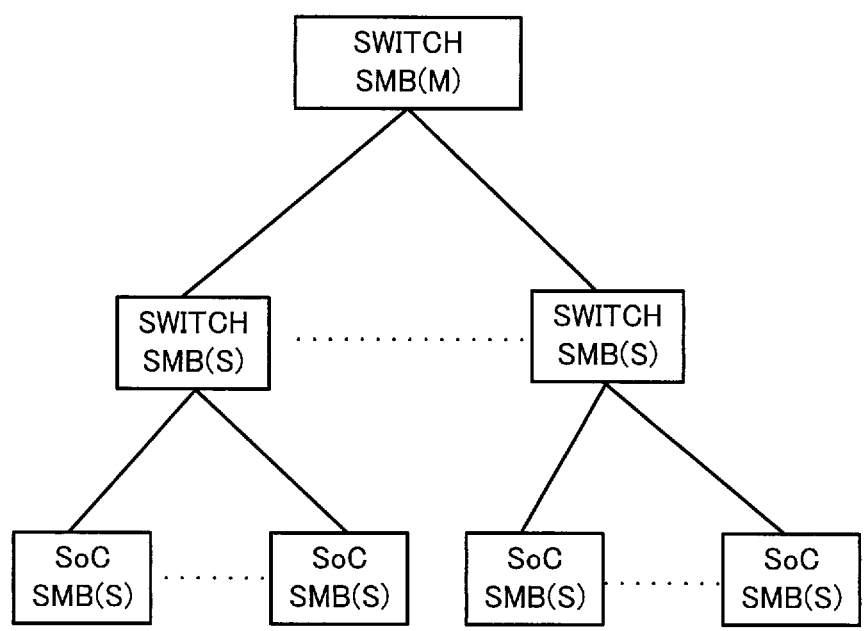
FIG. 8 illustrates another example of the relationship between a master and slaves in the status monitoring processing.

FIG. 8 illustrates another example of the relationship between a master and slaves in the status monitoring processing.

In the example in FIG. 8, the status monitoring circuits in the switches (corresponding to the switches 22a1 to 22am in FIG. 2) in an intermediate hierarchical layer in the system have a relay function between the status monitoring circuit in the switch functioning as a master and the status monitoring circuits of the SoCs. In the case of this system, the status information about the plurality of SoCs is first collected by the status monitoring circuits in the switches in the intermediate hierarchical layer and next transmitted to the status monitoring circuit in the switch functioning as the master.

Next, an example of how a master controls slaves based on status information will be described.

When a master detects abnormality from the received status information, the master transmits a signal that instructs prevention of the operation of the corresponding abnormal slave. For example, the master prevents the operation of this slave by instructing turning off of the power supply to a certain element in the slave or by instructing turning off of the power supply to the slave itself.

Figure 9:
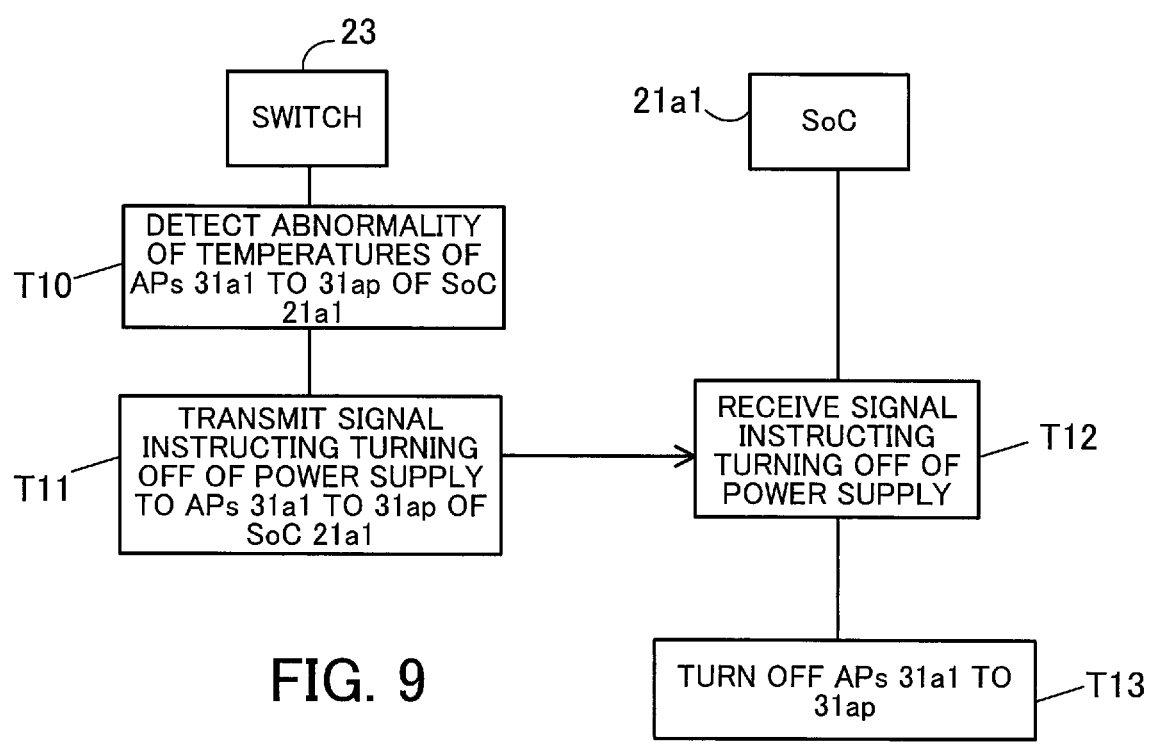
FIG. 9 is a sequence diagram illustrating an example of how a master controls a slave based on status information.

FIG. 9 is a sequence diagram illustrating an example of how a master controls slaves based on status information.

For example, the MCU in the status monitoring circuit 33b in the switch 23 detects abnormality of the temperatures of the APs 31a1 to 31ap in the SoC 21a1 according to the status information received from the individual slaves (T10). The detection of the abnormality based on the status information may be performed by the MCU in the status monitoring circuit 33b. Alternatively, a user may perform this detection based on the status information displayed on a display apparatus of an external apparatus, for example. In the latter case, a user enters a signal indicating that the abnormality (for example, the temperature abnormality as described above) has been detected to the status monitoring circuit 33b by using an input device.

If abnormality of the temperatures of the APs 31a1 to 31ap in the SoC 21a1 is detected, controlled by the MCU, the secure communication circuit in the status monitoring circuit 33b in the switch 23 transmits a signal that instructs turning off of the power supply to the APs 31a1 to 31ap to the SoC 21a1 (T11). The secure communication circuit may encrypt this signal and transmit the encrypted signal.

The secure communication circuit 31g6 in the SoC 21a1 receives the signal that instructs the turning off of the power supply to the APs 31a1 to 31ap (T12). If this signal is encrypted, the secure communication circuit 31g6 decrypts the encrypted signal. Next, controlled by the MCU 31g1, the power supply control circuit 31g4 turns off the power supply to the APs 31a1 to 31ap (T13).

Figure 10:
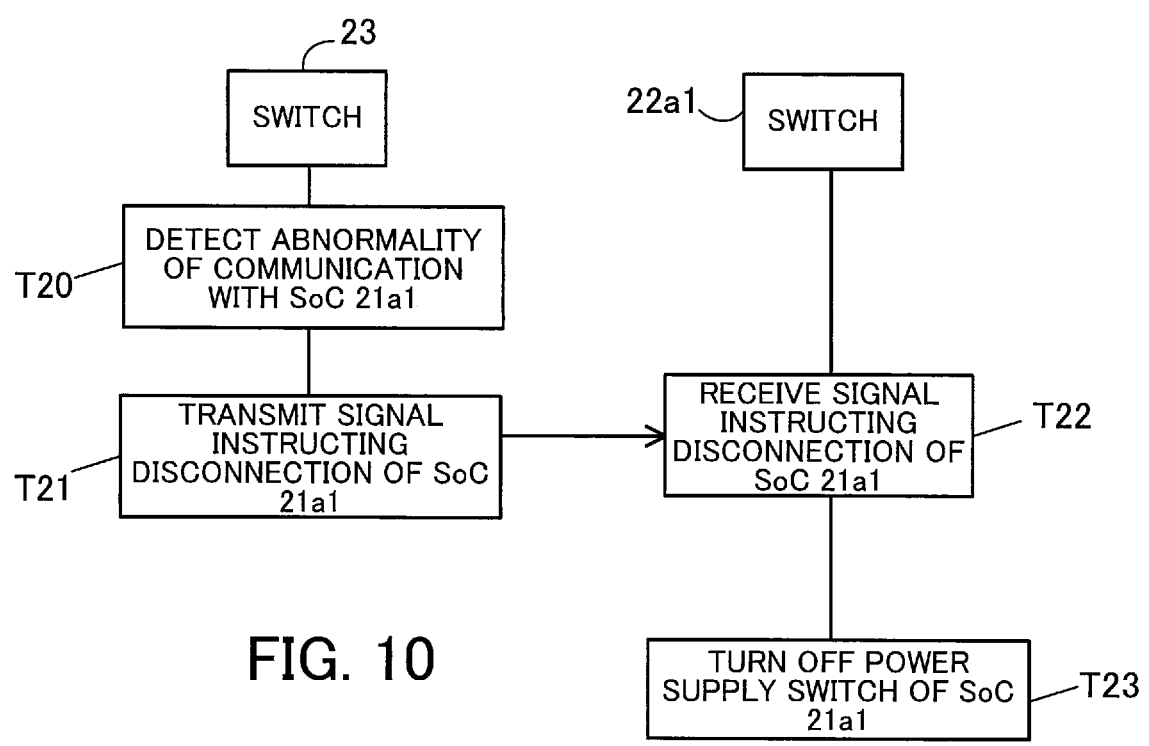
FIG. 10 is a sequence diagram illustrating another example of how a master controls a slave based on status information.

FIG. 10 is a sequence diagram illustrating another example of how a master controls slaves based on status information.

For example, the MCU in the status monitoring circuit 33b in the switch 23 detects abnormality of the communication with the SoC 21a1 according to the received status information about the individual salves (T20). In this case, controlled by the MCU, the secure communication circuit in the status monitoring circuit 33b in the switch 23 transmits a signal that instructs disconnection of the SoC 21a1 to the switch 22a1 that controls the power supply switch of the SoC 21a1 (T21). The secure communication circuit may encrypt this signal and transmit the encrypted signal.

The secure communication circuit in the status monitoring circuit 32c in the switch 22a1 receives the signal that instructs disconnection of the SoC 21a1 (T22). If this signal is encrypted, the secure communication circuit decrypts the encrypted signal. Next, controlled by the MCU in the status monitoring circuit 32c, the power supply control circuit in the status monitoring circuit 32c turns off the power supply switch of the SoC 21a1 (T23).

In the processing apparatus 20 according to the second embodiment described above, the status information indicating statuses of the plurality of SoCs (the SoCs 21a1 to 21an, 21b1 to 21bn, etc.) and the plurality of switches 22a1 to 22am and 23 is first encrypted and is next collected by a single SoC or switch. In this way, the status of the individual SoC or switch is securely monitored. In addition, the wiring is made less complicated than that of a case where another chip for collecting the status information indicating the statuses of the individual SoCs and switches is arranged.

The above description has been made assuming that the individual SoCs or switches of the processing apparatus 20 have a function of acquiring or collecting status information. However, alternatively, the processing apparatus 20 may include an SoC or switch that does not have this function of acquiring or collecting status information.

According to one aspect, statuses of a plurality of semiconductor integrated circuits are securely monitored.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A processing apparatus comprising:
    a first semiconductor integrated circuit which is a one-chip semiconductor integrated circuit; and
    a plurality of second semiconductor integrated circuits each of which is a one-chip semiconductor integrated circuit,
    wherein the first semiconductor integrated circuit includes a first status monitoring circuit configured to instruct the plurality of second semiconductor integrated circuits to transmit status information indicating respective statuses of the plurality of second semiconductor integrated circuits, and
    wherein each of the plurality of second semiconductor integrated circuits includes a second status monitoring circuit configured to transmit, upon receiving an instruction for transmission of the status information, encrypted information in which the status information is encrypted to the first semiconductor integrated circuit.

2. The processing apparatus according to claim 1, wherein the first status monitoring circuit is configured to receive the encrypted information, decrypt the encrypted information to generate the status information, and output the status information to an external apparatus.

3. The processing apparatus according to claim 1, wherein the first semiconductor integrated circuit having a function of a network switch.

4. The processing apparatus according to claim 1, wherein the status information includes information about power supply voltages, temperatures, or load statuses of the plurality of second semiconductor integrated circuits or information about an error that has occurred in any one of the plurality of second semiconductor integrated circuits.

5. The processing apparatus according to claim 1,
wherein the second status monitoring circuit includes:
a control circuit configured to read, upon receiving the instruction for transmission of the status information from the first status monitoring circuit, the status information from a storage circuit in which the status information is stored; and
a communication circuit configured to generate the encrypted information in which the status information read from the storage circuit is encrypted and transmit the encrypted information.

6. The processing apparatus according to claim 1,
wherein, in a boot processing of the processing apparatus, one of the plurality of second semiconductor integrated circuits functions as a master, and remaining ones of the plurality of second semiconductor integrated circuits function as slaves, and
wherein, in a status monitoring processing of the processing apparatus, the first semiconductor integrated circuit functions as a master, and the plurality of second semiconductor integrated circuits function as slaves.

7. The processing apparatus according to claim 1,
wherein the second status monitoring circuit includes a communication circuit configured to generate the encrypted information in which the status information is encrypted and transmit the encrypted information,
wherein, in a boot processing of the processing apparatus, when the communication circuit is included in a second semiconductor integrated circuit that functions as a master, the communication circuit encrypts a boot code and transmits the encrypted boot code to the first semiconductor integrated circuit, and
wherein, in a boot processing of the processing apparatus, when the communication circuit is included in a second semiconductor integrated circuit that functions as a slave, the communication circuit receives an encrypted boot code from the first semiconductor integrated circuit and decrypts the encrypted boot code.

8. The processing apparatus according to claim 1,
wherein the plurality of second semiconductor integrated circuits are configured to communicate with the first semiconductor integrated circuit via a first network, and
wherein each of the plurality of second semiconductor integrated circuits is configured to transmit the encrypted information to the first semiconductor integrated circuit via a second network that is independent of the first network and that is not connected to any element outside the processing apparatus.

9. The processing apparatus according to claim 1, wherein the first status monitoring circuit is configured to detect an error based on the status information generated by decrypting the encrypted information received and transmit a signal for instructing prevention of an operation of a third semiconductor integrated circuit in which the error has occurred among the plurality of second semiconductor integrated circuits.

10. A semiconductor integrated circuit comprising:
an interface circuit configured to communicate with a plurality of semiconductor integrated circuits each of which is a one-chip semiconductor integrated circuit;
a communication circuit configured to instruct the plurality of semiconductor integrated circuit to transmit status information indicating respective statuses of the plurality of semiconductor integrated circuits, individually receive, from the plurality of semiconductor integrated circuits, encrypted information in which the status information is encrypted, and generate the status information by decrypting the encrypted information; and
an output circuit configured to output the status information to an external apparatus,
wherein the semiconductor integrated circuit is a one-chip semiconductor integrated circuit.

11. The semiconductor integrated circuit according to claim 10, wherein the status information includes information about power supply voltages, temperatures, or load statuses of the plurality of semiconductor integrated circuits or information about an error that has occurred in any one of the plurality of semiconductor integrated circuits.

12. The semiconductor integrated circuit according to claim 10, wherein the communication circuit is configured to detect an error based on the status information generated by decrypting the encrypted information received and transmit a signal for instructing prevention of an operation of a semiconductor integrated circuit in which the error has occurred among the plurality of semiconductor integrated circuits.

13. A semiconductor integrated circuit comprising:
a storage circuit configured to hold status information indicating a status of the semiconductor integrated circuit;
a control circuit configured to read the status information from the storage circuit;
an interface circuit configured to communicate with a first semiconductor integrated circuit which is a one-chip semiconductor integrated circuit; and
a communication circuit configured to generate, upon receiving an instruction for transmission of the status information from the first semiconductor integrated circuit, encrypted information in which the status information read from the storage circuit is encrypted and transmit the encrypted information to the first semiconductor integrated circuit
wherein the semiconductor integrated circuit is a one-chip semiconductor integrated circuit.

14. The semiconductor integrated circuit according to claim 13, wherein the status information includes information about power supply voltages, temperatures, or load statuses of the semiconductor integrated circuit or information about an error that has occurred in the semiconductor integrated circuit.

15. A status monitoring method for a processing apparatus including a first semiconductor integrated circuit which is a one-chip semiconductor integrated circuit, and a plurality of second semiconductor integrated circuits each of which is a one-chip semiconductor integrated circuit, the status monitoring method comprising:
instructing, by a first status monitoring circuit included in the first semiconductor integrated circuit, the plurality of second semiconductor integrated circuits to transmit status information indicating respective statuses of the plurality of second semiconductor integrated circuits; and transmitting, by a second status monitoring circuit in each of the plurality of second semiconductor integrated circuits, encrypted information in which the status information is encrypted to the first semiconductor integrated circuit, upon receiving an instruction for transmission of the status information.

16. The status monitoring method according to claim 15, wherein the first status monitoring circuit is configured to receive the encrypted information, decrypt the encrypted information to generate the status information, and output the status information to an external apparatus.

17. The status monitoring method according to claim 15, wherein the status information includes information about power supply voltages, temperatures, or load statuses of the plurality of second semiconductor integrated circuits or information about an error that has occurred in any one of the plurality of second semiconductor integrated circuits.

18. The status monitoring method according to claim 15, wherein the second status monitoring circuit includes:
a control circuit configured to read, upon receiving the instruction for transmission of the status information from the first status monitoring circuit, the status information from a storage circuit in which the status information is stored; and
a communication circuit configured to generate the encrypted information in which the status information read from the storage circuit is encrypted and transmit the encrypted information.

19. The status monitoring method according to claim 15, wherein, in a boot processing of the processing apparatus, one of the plurality of second semiconductor integrated circuits functions as a master, and remaining ones of the plurality of second semiconductor integrated circuits function as slaves, and
wherein, in a status monitoring processing of the processing apparatus, the first semiconductor integrated circuit functions as a master, and the plurality of second semiconductor integrated circuits function as slaves.

20. The status monitoring method according to claim 15, wherein the second status monitoring circuit includes a communication circuit configured to generate the encrypted information in which the status information is encrypted and transmit the encrypted information,
wherein, in a boot processing of the processing apparatus, when the communication circuit is included in a second semiconductor integrated circuit that functions as a master, the communication circuit encrypts a boot code and transmits the encrypted boot code to the first semiconductor integrated circuit, and
wherein, in a boot processing of the processing apparatus, when the communication circuit is included in a second semiconductor integrated circuit that functions as a slave, the communication circuit receives an encrypted boot code from the first semiconductor integrated circuit and decrypts the encrypted boot code.

* * * * *